United States Patent [19]

Matrick

[11] Patent Number: 5,205,861

[45] Date of Patent: Apr. 27, 1993

[54] AQUEOUS INK JET INKS CONTAINING ALKYLENE OXIDE CONDENSATES OF CERTAIN NITROGEN HETEROCYCLIC COMPOUNDS AS COSOLVENTS

[75] Inventor: Howard Matrick, Highlands, N.J.

[73] Assignee: E. I. Du Pont de Nemours and Company, Wilmington, Del.

[21] Appl. No.: 774,074

[22] Filed: Oct. 9, 1991

[51] Int. Cl.$^5$ ............................................. C09D 11/02
[52] U.S. Cl. ................................ 106/20 D; 106/22 H; 106/23 H
[58] Field of Search ................................... 106/20, 22

[56] References Cited

U.S. PATENT DOCUMENTS

| | | | |
|---|---|---|---|
| 4,076,494 | 2/1978 | Schuster et al. | 106/22 |
| 4,455,168 | 6/1984 | Shimada et al. | 106/20 |
| 4,781,758 | 2/1988 | Gendler et al. | 106/22 |
| 5,085,698 | 2/1992 | Ma et al. | 106/20 |
| 5,141,556 | 8/1992 | Matrick | 106/20 |

FOREIGN PATENT DOCUMENTS 103274  4/1990  Japan .

Primary Examiner—Mark L. Bell
Assistant Examiner—Helene Klemanski

[57] ABSTRACT

An ink for ink jet printers which comprises an aqueous carrier medium, pigment dispersion or dye and a nitrogen heterocyclic diol cosolvent which retards or inhibits pluggage failure. The cosolvent has a solubility in water of at least 4.5 parts in 100 parts of water at 25° C. The pigment dispersion consists of pigment particles and a polymeric dispersant, having a hydrophilic segment and a segment that links to the pigment. These inks exhibit excellent decap performance, are storage stable and give images having excellent print quality.

35 Claims, No Drawings 5,205,861

AQUEOUS INK JET INKS CONTAINING ALKYLENE OXIDE CONDENSATES OF CERTAIN NITROGEN HETEROCYCLIC COMPOUNDS AS COSOLVENTS

FIELD OF THE INVENTION

This invention relates to aqueous inks for ink jet printers, and, more particularly, to aqueous, colored inks containing alkylene oxide condensates of certain nitrogen heterocyclic compounds as cosolvents which impart pluggage resistance to the inks.

BACKGROUND OF THE INVENTION

Ink jet printing is a non-impact method that in response to a digital signal produces droplets of ink that are deposited on a substrate such as paper or transparent film. Ink jet printers, especially thermal or bubble jet drop-on-demand printers have found broad application as output for personal computers in the office and the home.

Thermal ink jet printers use a battery of nozzles each containing a resistor element to fire ink droplets toward the print media. Nozzle openings are typically about 40-60 micrometers in diameter. These small dimensions require inks that do not plug these small openings.

Therefore, a critical requirement for an ink jet ink is the ability to remain in a fluid condition in a pen opening on exposure to air, so called "decap" conditions. This allows a pen to function after a period of non-use or during operation of infrequently utilized nozzles. A major concern with all ink jet printers is pluggage of nozzles during operation and between operations. This is caused by evaporation of an organic solvent or water from the surface of the nozzle. In dye-based inks, this can cause crystallization or precipitation of soluble components such as dye or solid additives. In pigment-based inks this evaporation can cause:

a. precipitation of the dispersion
b. flocculation of the pigment dispersion
c. precipitation of solid additives.

Initial evaporation generally causes an increase in viscosity which affects the ability of the nozzle to fire a drop of ink since ink jet pens are designed to operate within specific viscosity ranges. The inception of pluggage may cause distortion of the image or alphanumeric character. This may appear as a drop of ink which is displaced from its intended position. Sometimes two drops will be formed equally spaced from the intended target position. Sometimes small numerous satellite drops are produced. On some occasions the drop may even reach its intended position but at a lower drop volume producing a lower optical density image. Ultimately the plugged nozzle will fail to fire and no image will be generated.

Ink jet printers are designed to prevent excessive evaporation of solvent from pen nozzles by seating the pen cartridge in an air tight chamber when not in use. These devices become ineffective with continued printer use because dried ink deposits at the rubber seals and the system loses its air-tight condition. Another device used is a wiper that removes solid formed at the surface of the nozzle. This device is often ineffective because of the depth of the plug or because of sufficient hardness of the plug which thereby resisting mechanical removal. Another pluggage fix is the use of forced air or vacuum suction to clear the nozzle. These devices are often inefficient and add considerable expense to the cost of the printer.

A commonly used scheme to cure pluggage is to clear the plug by firing the pen in a non-image mode, i.e., into a collection receptacle or "spittoon". While this solution is the most effective remedy, it requires that the ink form a "soft" or noncohesive plug. To make this non-image pluggage clearance effective the surface plug must be mechanically or cohesively weak.

The compounds of this invention produce plugs that are easily removed by non-image firing or spitting.

A critical measured property for an ink jet ink is the "decap time" which is the length of time over which an ink remains fluid in a pen opening when exposed to air and therefore capable of firing a drop of ink at its intended target. "Decap" means the pen is uncovered or "decapped". The "decap" test is run by firing all pen nozzles successively 100 times at several programmed incrementally increasing time intervals. Each ink is given a time score for the first, 5th and 32nd drop firing. This time interval is the longest interval that the pen fires a specified drop without drop displacement or loss of density. The longer the time rating the more desirable the ink. Results are reported in Table 2.

The ability of a plug to be removable by non-image firing is measured by 5th and 32nd drop decap time values. It is highly desirable to obtain a long time interval for the fifth drop because this means the plug is easily removed with only 4 non-image firings. An ink with long decap values for both 5th and 32nd drop indicates a soft plug forms and is readily cleared.

A second important requirement for ink jet inks where the colorant is a pigment is for the pigment dispersion to remain stable throughout the life of the ink jet cartridge. Dye-based ink jet inks suffer from deficiencies in water fastness, smear fastness and lightfastness. Therefore, pigments are a preferred alternative to dyes provided the pigment dispersions can be made stable to flocculation and settling. Some cosolvents that are good pluggage inhibitors or promote soft plugs cause destabilization of pigment dispersions and therefore cannot be used in pigmented inks, e.g., Butyl Carbitol® and Dowanol TBH®. (See Comparative Examples 2 and 3, Table 2.)

Accordingly, a need exists for cosolvents which function as pluggage "softeners" or inhibitors without destabilizing pigment-based inks.

SUMMARY OF THE INVENTION

The cosolvents claimed in this invention have the ability to promote formation of easily removed nozzle plugs and are compatible with aqueous pigment dispersions. These cosolvent are also useful in dye-based inks.

In accordance with this invention there is provided an aqueous ink jet ink composition comprising:

(a) an aqueous carrier medium,
(b) a pigment dispersion or dye; and
(c) a nitrogen heterocyclic diol having a solubility in water of at least 4.5 parts in 100 parts of water at 25° C, and which is the reaction product of a heterocyclic compound which is monocyclic and comprises either a 5- or 6-membered ring which comprises 2 trivalent nitrogen atoms with one carbon atom spaced between them and wherein the nitrogen atoms are usually adjacent to 1-3 amide carbonyl groups and said carbon atom is a part of one carbonyl group; and an alkylene oxide selected from the group consisting of ethylene oxide, propylene oxide, and mixtures thereof.

More preferably, the nitrogen heterocyclic diol comprises an alkylene oxide condensate with a 5- or 6-membered ring heterocycle having a substituted ureido group and having a solubility in water of at least 4.5 parts in 100 parts of water at 25° C. and represented by the formula;

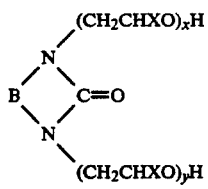

wherein $x+y=1$-40, preferably 2—10
$X=$ —H or —$CH_3$, and
B is a divalent group completing a 5- or 6-membered ring and is selected from the group consisting of:

i. 

wherein R= —H, —$CH_3$, —$C_2H_5$, or —$C_3H_8$ ii. 

wherein R and R' = —H, —$CH_3$, —$C_2H_5$, or —$C_3H_8$ iii. 

iv. 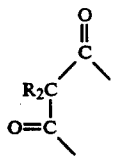

wherein R= —H, —$CH_3$, —$C_2H_5$, or —$C_3H_8$ v. 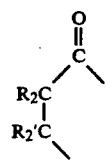

wherein R and R' = —H, —$CH_3$, —$C_2H_5$, or —$C_3H_8$, vi. 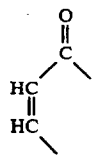

DETAILED DESCRIPTION OF THE INVENTION

The invention relates to an ink jet ink composition which is particularly suited for use in ink jet printers in general, and thermal ink jet printers in particular. The ink jet ink composition encompasses both pigment-based inks and dye-based inks. The pigmented inks comprise an aqueous carrier medium, a nitrogen heterocyclic diol cosolvent and a pigment dispersion which is an aqueous dispersion of pigment particles stabilized by dispersants, usually polymeric dispersants. These inks are stable over long periods, both in storage and in the printer. The dye-based inks comprise an aqueous carrier medium, a dye and a nitrogen heterocyclic diol cosolvent. The inks may be adapted to the requirements of a particular ink jet printer to provide a balance of light stability, smear resistance, viscosity, surface tension, high optical density, and crust resistance.

The aqueous carrier comprises water or a mixture of water and an organic water soluble compound other than the nitrogen heterocyclic diol compound.

A major advantage of using the cosolvents described in this invention is their compatibility with pigment dispersions as indicated in Table 3. However, the cosolvents can also be used in dye-based ink to impart improved pluggage resistance of aqueous dye-based inks.

Another advantage is the resistance of these cosolvents to chemical change especially to hydrolysis in an aqueous media. Cosolvents such as formamide and urea which are known to have good pluggage performance are hydrolytically unstable.

NITROGEN HETEROCYCLIC DIOL COSOLVENT

The compounds of this invention fill a need for pigmented ink jet inks having improved pluggage resistance and excellent dispersion stability. As shown in Example 1, Table 2, the ink containing the heterocyclic diol was still printing perfectly on the fifth drop after 6 hours at which point the test was terminated. This is highly unusual and far superior to the comparative examples of Table 2.

The nitrogen heterocyclic diol has a solubility in water of at least 4.5 parts in 100 parts of water at 25° C., and is the reaction product of a heterocyclic compound which is monocyclic and comprises either a 5- or 6-membered ring which comprises 2 trivalent nitrogen atoms with one carbon atom spaced between them and wherein the nitrogen atoms are usually adjacent to 1–3 amide carbonyl groups and said carbon atom is a part of one carbonyl group; and an alkylene oxide selected from the group consisting of ethylene oxide, propylene oxide, and mixtures thereof.

The heterocyclic diol cosolvent is comprised of:
a. A cyclic ureido group,

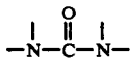

in which each nitrogen is substituted by a 2-hydroxyalkyl group or a poly(2-hydroxyalkyl) group.

b. A 5- or 6-membered heterocyclic ring in which the remaining ring atoms are selected from the group consisting of:

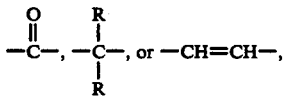

and combinations thereof.

Preferably, the heterocyclic diol cosolvent is monocyclic and has the following general structure:

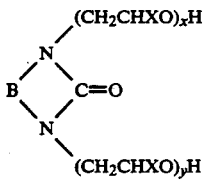

wherein $x+y=1-40$, preferably 2-10
$X = $ —H or —CH$_3$, and
B is a divalent group completing a 5- or 6-membered ring and is selected from the group consisting of:

  i.

where R = —H, —CH$_3$, —C$_2$H$_5$, or —C$_3$H$_8$

  ii.

wherein R and R' = —H, —CH$_3$, —C$_2$H$_5$, or —C$_3$H$_8$

  iii.

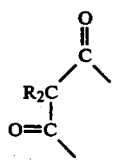  iv.

wherein R = —H, —CH$_3$, —C$_2$H$_5$, or —C$_3$H$_8$

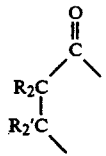  v.

wherein R and R' = —H, —CH$_3$, —C$_2$H$_5$, or —C$_3$H$_8$, and

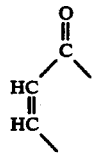  vi.

The compounds are prepared by reaction of imido groups with alkylene oxide, preferably ethylene oxide. This produces mixtures of compounds so that the structures illustrated are based on average compositions which many contain a range of alkylene oxide units. Random and block copolymer chains of propylene and ethylene oxides may be employed. For example the cyclic urea may be reacted first with propylene oxide then in sequence terminated with ethylene oxide.

Alkyl substitution on the heterocyclic ring may contain up to 3 or 4 carbons per alkyl side chain but the cosolvents are especially effective where the solubility is at least 4.5 grams per 100 grams of water at 25° C.

Some suitable diols are illustrated as follows:

a. 1,3-bis[poly(2-oxyalkylene)]-5,5-dialkylhydantoin having the general structure:

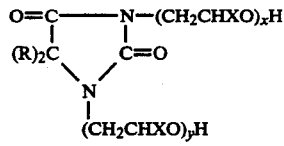

Where X is H, R is CH$_3$—, and $x+y=2$, the diol is bis-1,3-(2-hydroxyethyl)-5,5-dimethylhydantoin having the structure:

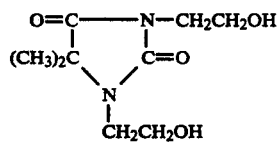

This material is available as Dantocol ® DHE from Lonza, Inc., Fair Lawn, N.J. 07410.

b. 1,3-Bis[poly(2-oxyalkylene)]-5,5-dialkylhydantoin having the general structure:

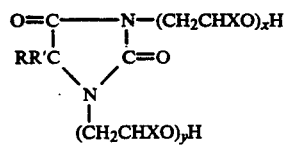

wherein $x+y=1-10$

R, R' = —H, —CH$_3$, —C$_2$H$_5$, —C$_3$H$_8$

X = —H, , —CH$_3$ c. 1,3-Bis[poly(2-oxyalkylene)]-4,4,5,5-tetraalkyl-2-imidazolidones having the general formula structure:

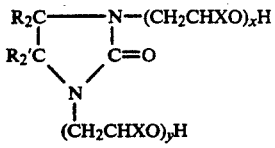

wherein $x+y+1-10$

R, R', = —H, —CH$_3$, —C$_2$H$_5$, or —C$_3$H$_8$

X = —H, —CH$_3$ d. 1,3-Bis[poly(2-oxyalkylene)]-2,4,5-triketoimidazolidine having the general structure:

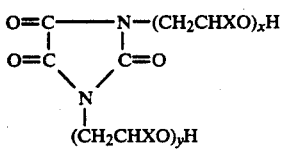

wherein $x+y+1-10$

X = —H, —CH$_3$ e. 1,3-Bis[poly(2-oxyalkylene)]-5,5-dialkylbarbiturate having the general structure:

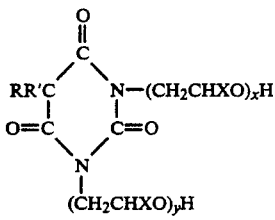

wherein $x+y=1-10$

R, R' = —H, —CH$_3$, —C$_2$H$_5$, or —C$_3$H$_8$

X = —H, —CH$_3$ f. 1,3-Bis[poly(2-oxyalkylene)]-5,5,6,6-tetraalkyl-5,6-dihydro-uracil having the general structure:

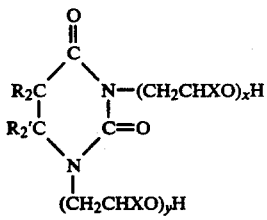

wherein $x+y=1-10$

R, R' = —H, —CH$_3$, —C$_2$H$_5$, or —C$_3$H$_8$

X = —H, —CH$_3$ g. 1,3-Bis[poly(2-oxyalkylene)]-uracil having the general structure:

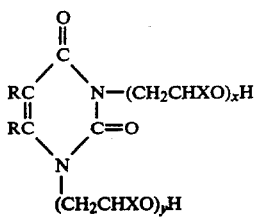

wherein $x+y=1-10$

X = —H, —CH$_3$

R = —H, —CH$_3$, —C$_2$H$_5$, or —C$_3$H$_8$

PIGMENT DISPERSION

The pigment dispersion comprises a pigment and usually a dispersant. Preferably, the dispersant is a polymeric dispersant.

Dispersants

In addition to, or in place of a polymeric dispersant surfactant compounds may be used as dispersants. These may be anionic, cationic, nonionic or amphoteric. A detailed list of non-polymeric as well as some polymer dispersants are listed in the section on dispersants, pages 110-129, 1990 McCutcheon's Functional Materials, North American Edition, Manufacturing Confection Publishing Co., Glen Rock, N.J., 07452.

Polymeric Dispersants

Polymeric dispersants suitable for practicing the invention include AB or BAB block copolymer wherein the A block is hydrophobic and serves to link with the pigment, and the B block is hydrophilic and serves to disperse the pigment in the aqueous medium. Selection of the polymer for a specific application will depend on the selected pigment and aqueous medium. In general, the polymer is an AB or BAB block copolymer wherein (a) the A segment is a hydrophobic homopolymer or copolymer of an acrylic monomer having the formula:

CH$_2$=C(X)(Y)

wherein X is H Or CH$_3$; and Y is C(O)OR$_1$, C(O)NR$_2$R$_3$, or CN, wherein R$_1$ is an alkyl, aryl, or alkylaryl group having 1 to 20 carbon atoms, and R$_2$ and R$_3$ are hydrogen or an alkyl, aryl, or alkylaryl group having 1 to 9 carbon atoms; said A segment having an average molecular weight of at least approximately 300 and being water insoluble; and (b) the B segment is a hydrophilic polymer, or salt thereof, of (1) an acrylic monomer having the formula:

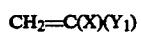

CH$_2$=C(X)(Y$_1$)

wherein X is H or CH$_3$; and Y$_1$ is C(O)OH, C(O)NR$_2$R$_3$, C(O)OR$_4$NR$_2$R$_3$ or C(OR$_5$); wherein R$_2$ and R$_3$ are hydrogen or an alkyl, aryl, or alkylaryl group having 1 to 9 carbon atoms; R$_4$ is an alkyl diradical having 1 to 5 carbon atoms; and R$_5$ is an alkyl group having 1 to 20 carbon atoms and optionally containing one or more hydroxyl or ether groups; or (2) a copolymer of the acrylic monomer of (1) with an acrylic monomer having the formula:

$CH_2=C(X)(Y)$ where X and Y are the substituent groups defined for the A segment; the B segment having an average molecular weight of at least approximately 300 and being water soluble. The B block(s) generally will constitute 10 to 90%, preferably 25 to 65%, of the entire block polymer by weight.

The A block is a polymer or copolymer prepared from at least one acrylic monomer having the formula set forth above. The $R_1$, $R_2$ and $R_3$ groups optionally may contain hydroxy, ether, $OSi(CH_3)_3$ groups, and similar substituent groups. Representative monomers that may be selected include, but are not limited to, the following: methyl methacrylate (MMA), ethyl methacrylate (EMA), propyl methacrylate, n-butyl methacrylate (BMA or NBMA), hexyl methacrylate, 2-ethylhexyl methacrylate (EHMA), octyl methacrylate, lauryl methacrylate (LMA), stearyl methacrylate, phenyl methacrylate, benzyl methacrylate, hydroxyethyl methacrylate (HEMA), hydroxypropyl methacrylate, 2-ethoxyethyl methacrylate, methacrylonitrile, 2-trimethylsiloxyethyl methacrylate, glycidyl methacrylate(GMA), p-tolyl methacrylate, sorbyl methacrylate, methyl acrylate, ethyl acrylate, propyl acrylate, butyl acrylate, hexyl acrylate, 2-ethylhexyl acrylate, octyl acrylate, lauryl acrylate, stearyl acrylate, phenyl acrylate, benzyl acrylate, hydroxyethyl acrylate, hydroxypropyl acrylate, acrylonitrile, 2-trimethylsiloxyethyl acrylate, glycidyl acrylate, p-tolyl acrylate, and sorbyl acrylate. Preferred A blocks are homopolymers and copolymers prepared from methyl methacrylate, n-butyl methacrylate, 2-ethylhexyl methacrylate, or copolymers of methyl methacrylate with n-butyl methacrylate.

The A block also may contain a hydrophilic monomer such as $CH_2=C(X)(Y)'$, wherein X is H or $CH_3$ and Y' is $C(O)OH$, $C(O)NR_2R_3$, $C(O)OR_4NR_2R_3$, $C(OR_5)$, or their salts, wherein $R_2$ and $R_3$ may be H or C1 to C9 alkyl, aryl, or alkylaryl, $R_4$ is a C1 to C5 alkyl diradical, and $R_5$ is a C1 to C20 alkyl diradical which may contain hydroxy or ether groups, to provide some changes in solubility. However, there should not be enough hydrophilic monomer present in the A block to render it, or its salt, completely water soluble.

The B block is a polymer prepared from at least one acrylic monomer having the formula provided above. Representative monomers include methacrylic acid (MAA), acrylic acid, dimethylaminoethyl methacrylate (DMAEMA), diethylaminoethyl methacrylate, t-butylaminoethyl methacrylate, dimethylaminoethyl acrylate, diethylaminoethyl acrylate, dimethylaminopropyl methacrylamide, methacrylamide, acrylamide, and dimethylacrylamide. Homopolymers or copolymers of methacrylic acid or dimethylaminoethyl methacrylate are preferred.

The acid containing polymer may be made directly or may be made from a blocked monomer with the blocking group being removed after polymerization. Examples of blocked monomers that generate acrylic or methacrylic acid after removal of the blocking group include: trimethylsilyl methacrylate (TMS-MAA), trimethylsilyl acrylate, 1-butoxyethyl methacrylate, 1-ethoxyethyl methacrylate, 1-butoxyethyl acrylate, 1-ethoxyethyl acrylate, 2-tetrahydropyranyl acrylate, and 2-tetrahydropyranyl methacrylate.

The B block may be a copolymer of an acid or amino containing monomer with other monomers, such as those used in the A block. The acid or amino monomer may be used in a range of 10 to 100%, preferable in a range of 20 to 100%, of the B block composition. The B block(s) generally will constitute 10 to 90%, preferably 25 to 65%, of the entire block polymer by weight.

Block copolymers that are useful in practicing the invention have a number average molecular weight below 20,000, preferably below 15,000, and typically in the range of 1,000 to 3,000. Preferred block copolymers have number average molecular weights in the range of 500 to 1500 for each A and B block.

Representative AB and BAB block polymers that may be selected include the following, wherein the values recited represent the degree of polymerization of each monomer. A double slash indicates a separation between blocks and a single slash indicates a random copolymer. For example, MMA//MMA/MMA 10//5/7.5 is an AB block polymer with an A block of MMA that is 10 monomer units long, molecular weight of 1000 and a B block that is a copolymer of MMA and MAA with 5 monomer units of MMA and 7.5 units of MAA; molecular weight of the B block is 1145.

| AB BLOCK POLYMER | MOL. WEIGHT |
|---|---|
| EHMA//EHMA/MAA | |
| 3//3/5 | 1618 |
| 5//2.5/2.5 | 1700 |
| 5//5/10 | 2840 |
| 20//10/10 | 6800 |
| 15//11/22 | 7040 |
| EHMA//LMA/MAA | |
| 10//10/12 | 5552 |
| EHMA//MMA/EHMA/MAA | |
| 10//5/5/12 | 4502 |
| EHMA//MMA/MAA | |
| 5//5/10 | 2350 |
| 5//10/10 | 2850 |
| EHMA//MAA | |
| 15//5 | 3400 |
| BMA//BMA/MAA | |
| 5//2.5/2.5 | 1280 |
| 10//5/10 | 3000 |
| 20//10/20 | 6000 |
| 15//7.5/3 | 3450 |
| 5//5/10 | 2300 |
| 5//10/5 | 2560 |
| BMA//MMA/MA | |
| 15//15/5 | 4060 |
| 15//7.5/3 | 3140 |
| 10//5/10 | 2780 |
| MMA//MMA/MAA | |
| 10//5/10 | 2360 |
| 10//5/5 | 1930 |
| 10//5/7.5 | 2150 |
| 20//5/7.5 | 3150 |
| 15/7.5/3 | 2770 |
| MMA//EHMA/MAA | |
| 5//5/10 | 2350 |
| 10//5/10 | 2850 |
| BMA/MMA//BMA/MAA | |
| 5/5//5/10 | 2780 |
| BMA//MAA | |
| 10//10 | 2260 |
| BMA//HEMA/MAA | |
| 15//7.5/3 | 3360 |
| 7.5//7.5/3 | 2300 |
| 15//7.5/7.5 | 3750 |
| BMA//BMA/DMAEMA | |
| 10//5/10 | 3700 |
| BMA//BMA/DMAEMA/MAA | |
| 10//5/5/5 | 2635 |
| BAB BLOCK POLYMER | |

| -continued | |
|---|---|
| | MOL. WEIGHT |
| BMA/MAA//BMA//BMA/MAA | |
| 5/10//10//5/10 | 4560 |
| MMA/MAA//MMA//MMA/MAA | |
| 5/7.5//10//5/7.5 | 3290 |

Preferred block polymers are methyl methacrylate//methyl methacrylate/methacrylic acid (10//5/7.5), 2-ethylhexyl methacrylate//2-ethylhexyl methacrylate/methacrylic acid (5//5/10), n-butyl methacrylate//n-butyl methacrylate/methacrylic acid (10//5/10), n-butyl methacrylate//methacrylic acid (10//10)), ethylhexyl methacrylate//methyl methacrylate/methacrylic acid (5//10/10), n-butylmethacrylate//2-hydroxyethyl methacrylate/methacrylic acid (5//10/10), n-butylmethacrylate//2-hydroxyethyl methacrylate/methacrylic acid (15//7.5/3), methyl methacrylate//ethylhexyl methacrylate/methacrylic acid (5//5/10), and n-butyl methacrylate//n-butyl methacrylate/dimethylaminoethyl methacrylate (10//5/10).

To solubilize the B block into the aqueous medium, it may be necessary to make salts of either the acid or amino groups contained in the B block. Salts of the acid monomers can be made with the counter component being selected from organic bases such as mono-, di-, trimethylamine, morpholine, n-methyl morpholine; alcohol amines such as dimethylethanolamine (DMEA), methyldiethanolamine, mono-, di-, and triethanolamine; pyridine; ammonium hydroxide; tetraalkylammonium salts such as tetramethylammonium hydroxide, tetraethylammonium hydroxide; alkali metals such as lithium, sodium and potassium, and the like. Preferred neutralizing agents include dimethylethanolamine and sodium and potassium hydroxides, with potassium hydroxide being particularly preferred for inks to be used in thermal ink jet printers. Salts of the amino monomers can be made with the counter component being selected from organic acids such as acetic acid, formic acid, oxalic acid, dimethylol propionic acid, halogens such as chloride, fluoride, and bromide, and other inorganic acids, such as sulfuric acid, nitric acid, phosphoric acid and the like. It is also possible to convert the amino group into a tetraalkylammonium salt. Amphoteric polymers, that is polymer that contains both an acid group and an amino group, may be used as is or can be neutralized with either addition of acid or base.

The AB and BAB polymers can be advantageously produced by stepwise polymerization process such as anionic or group transfer polymerization as described in Webster, U.S. Pat. No. 4,508,880, the disclosure of which is incorporated herein by reference. Polymers so produced have precisely controlled molecular weight, block sizes and very narrow molecular weight distributions. The polymer typically has a dispersity less than 2, generally in the range of 1.0 to 1.4. Dispersity is the polymer weight average molecular weight divided by its number average molecular weight. Number average molecular weight can be determined by gel permeation chromatography (GPC). The AB or BAB block polymers may also be formed by free radical polymerization wherein the initiation unit is comprised of two different moieties which initiate polymerization at two distinctly different temperatures. However, this method may cause contamination of the block copolymers with homopolymer and coupled products.

The AB block polymers also may be prepared using conventional anionic polymerization techniques, in which a first block of the copolymer is formed, and upon completion of the first block, a second monomer stream is started to form a subsequent block of the polymer. A low reaction temperature, e.g., 0° to −70° C., is maintained in this case to minimize side reactions and form blocks of the desired molecular weights.

With many of these techniques, and especially with the group transfer polymerization process, the initiator may be non-functional, may contain an acid group (used as is or in a blocked form) or may contain an amino group. Either the hydrophobic A block or the hydrophilic B block may be made first. The BAB block polymers also may be prepared by anionic polymerization or group transfer polymerization techniques by first polymerizing one of the B Blocks, then polymerizing the hydrophobic A block, and then polymerizing the second B Block.

Although random copolymers can be used as dispersants they are not as effective in stabilizing pigment dispersions. Amongst these may be mentioned half-esters of maleic acid/styrene copolymers, lignin sulfonate derivatives and copolymers of acrylic and methacrylic acid with styrene.

Pigments

A wide variety of organic and inorganic pigments, alone or in combination, may be selected to make the ink. The term "pigment" as used herein means an insoluble colorant. The pigment particles are sufficiently small to permit free flow of the ink through the ink jet printing device, especially at the ejecting nozzles that usually have a diameter ranging from 10 micron to 50 micron. The particle size also has an influence on the pigment dispersion stability, which is critical throughout the life of the ink. Brownian motion of minute particles will help prevent the particles from settling. It is also desirable to use small particles for maximum color strength. The range of useful particle size is approximately 0.005 micron to 15 micron. Preferably, the pigment particle size should range from 0.005 to 5 micron, next preferably from 0.005 to 1 micron and, most preferably, from 0.005 to 0.3 micron.

The selected pigment may be used in dry or wet form. For example, pigments are usually manufactured in aqueous media and the resulting pigment is obtained as water wet presscake. In presscake form, the pigment is not aggregated to the extent that it is in dry form. Thus, pigments in water wet presscake form do not require as much deaggregation in the process of preparing the inks from dry pigments. Representative commercial dry pigments that may be used in practicing the invention include the following:

| Pigment Brand Name | Manufacturer | Pigment Color Index |
|---|---|---|
| Permanent Yellow DHG | Hoechst | Yellow 12 |
| Permanent Yellow GR | Hoechst | Yellow 13 |
| Permanent Yellow G | Hoechst | Yellow 14 |
| Permanent Yellow NCG-71 | Hoechst | Yellow 16 |
| Permanent Yellow GG | Hoechst | Yellow 17 |
| Hansa Yellow RA | Hoechst | Yellow 73 |
| Hansa Brilliant Yellow 5GX-02 | Hoechst | Yellow 74 |
| Dalamar ® Yellow YT-858-D | Heubach | Yellow 74 |
| Hansa Yellow X | Hoechst | Yellow 75 |
| Novoperm ® Yellow HR | Hoechst | Yellow 83 |
| Chromophtal ® Yellow 3G | Ciba-Geigy | Yellow 93 |
| Chromophtal ® Yellow GR | Ciba-Geigy | Yellow 95 |

-continued

| Pigment Brand Name | Manufacturer | Pigment Color Index |
|---|---|---|
| Novoperm ® Yellow FGL | Hoechst | Yellow 97 |
| Hansa Brilliant Yellow 10GX | Hoechst | Yellow 98 |
| Permanent Yellow G3R-01 | Hoechst | Yellow 114 |
| PV Fast Yellow H2G-01 | Hoechst | Yellow 120 |
| Chromophtal ® Yellow 8G | Ciba-Geigy | Yellow 128 |
| Irgazin ® Yellow 5GT | Ciba-Geigy | Yellow 129 |
| Hostaperm ® Yellow H4G | Hoechst | Yellow 151 |
| Hostaperm ® Yellow H3G | Hoechst | Yellow 154 |
| Hostaperm ® Yellow H6G | Hoechst | Yellow 175 |
| PV Fast Yellow HG | Hoechst | Yellow 180 |
| L74-1357 Yellow | Sun Chem. | |
| L75-1331 Yellow | Sun Chem. | |
| L75-2377 Yellow | Sun Chem. | |
| Hostaperm ® Orange GR | Hoechst | Orange 43 |
| Paliogen ® Orange | BASF | Orange 51 |
| Irgalite ® Rubine 4BL | Ciba-Geigy | Red 57:1 |
| Quindo ® Magenta | Mobay | Red 122 |
| Indofast ® Brilliant Scarlet | Mobay | Red 123 |
| Hostaperm ® Scarlet GO | Hoechst | Red 168 |
| Permanent Rubine F6B | Hoechst | Red 184 |
| Monastral ® Magenta | Ciba-Geigy | Red 202 |
| Monastral ® Scarlet | Ciba-Geigy | Red 207 |
| Heliogen ® Blue L 6901F | BASF | Blue 15:2 |
| Heliogen ® Blue NBD 7010 | BASF | |
| Heliogen ® Blue K 7090 | BASF | Blue 15:3 |
| Heliogen ® Blue L 7101F | BASF | Blue 15:4 |
| Paliogen ® Blue L 6470 | BASF | Blue 60 |
| Heucophthal ® Blue G, XBT-583D | Heubach | Blue 15:3 |
| Heliogen ® Green K 8683 | BASF | Green 7 |
| Heliogen ® Green L 9140 | BASF | Green 36 |
| Monastral ® Violet R | Ciba-Geigy | Violet 19 |
| Monastral ® Red B | Ciba-Geigy | Violet 19 |
| Quindo ® Red R6700 | Mobay | Violet 19 |
| Quindo ® Red R6713 | Mobay | Violet 19 |
| Indofast ® Violet | Mobay | Violet 23 |
| Monastral ® Violet Maroon B | Ciba-Geigy | Violet 42 |
| Monarch ® 1400 | Cabot | Black 7 |
| Monarch ® 1300 | Cabot | Black 7 |
| Monarch ® 1100 | Cabot | Black 7 |
| Monarch ® 1000 | Cabot | Black 7 |
| Monarch ® 900 | Cabot | Black 7 |
| Monarch ® 880 | Cabot | Black 7 |
| Monarch ® 800 | Cabot | Black 7 |
| Monarch ® 700 | Cabot | Black 7 |
| Raven 7000 | Columbian | Black 7 |
| Raven 5750 | Columbian | Black 7 |
| Raven 5250 | Columbian | Black 7 |
| Raven 5000 | Columbian | Black 7 |
| Raven 3500 | Columbian | Black 7 |
| Color Black FW 200 | Degussa | Black 7 |
| Color Black FW 2 | Degussa | Black 7 |
| Color Black FW 2V | Degussa | Black 7 |
| Color Black FW 1 | Degussa | Black 7 |
| Color Black FW 18 | Degussa | Black 7 |
| Color Black S 160 | Degussa | Black 7 |
| Color Black S 170 | Degussa | Black 7 |
| Special Black 6 | Degussa | Black 7 |
| Special Black 5 | Degussa | Black 7 |
| Special Black 4A | Degussa | Black 7 |
| Special Black 4 | Degussa | Black 7 |
| Printex U | Degussa | Black 7 |
| Printex V | Degussa | Black 7 |
| Printex 140U | Degussa | Black 7 |
| Printex 140V | Degussa | Black 7 |
| Tipure ® R-101 | Du Pont | White 6 |

Representative commercial pigments that can be used in the form of a water wet presscake include: Heucophthal ® Blue BT-585-P, Toluidine Red Y (C.I. Pigment Red 3), Quindo ® Magenta (Pigment Red 122), Magenta RV-6831 presscake (Mobay Chemical, Harmon Division, Haledon, N.J.), Sunfast ® Magenta 122 (Sun Chemical Corp., Cincinnati, Ohio), Indo ® Brilliant Scarlet (Pigment Red 123, C.I. No. 71145), Toluidine Red B (C.I. Pigment Red 3), Watchung ® Red B (C.I. Pigment Red 48), Permanent Rubine F6B13-1731 (Pigment Red 184), Hansa ® Yellow (Pigment Yellow 98), Dalamar ® Yellow YT-839-P (Pigment Yellow 74, C.I. No. 11741, Sunbrite ® Yellow 17 (Sun Chemical Corp, Cincinnati, Ohio), Toluidine Yellow G (C.I. Pigment Yellow 1), Pigment Scarlet (C.I. Pigment Red 60), Auric Brown (C.I. Pigment Brown 6), etc. Black pigments, such as carbon black, generally are not available in the form of aqueous presscakes.

Fine particles of metal or metal oxides also may be used to practice the invention. For example, metal and metal oxides are suitable for the preparation of magnetic ink jet inks. Fine particle size oxides, such as silica, alumina, titania, and the like, also may be selected. Furthermore, finely divided metal particles, such as copper, iron, steel, aluminum and alloys, may be selected for appropriate applications.

DYES

Dyes commonly used in aqueous ink jet inks include for example Acid, Direct, Food and Reactive dyes. The dyes may be present in an amount of up to approximately 20% by weight, based on the total weight of the ink.

Some useful dyes that may be mentioned are:
C.I. Food Blacks 1 and 2.
C.I. Acid Blacks 7, 24, 26, 48, 52, 58, 60, 107, 109, 118, 119, 131, 140, 155, 156 and 187.
C.I. Direct Blacks 17, 19, 32, 38, 51, 71, 74, 75, 112, 117, 154, 163, and 168.
C.I. Acid Reds 1, 8, 17, 32, 35, 37, 42, 57, 92, 115, 119, 131, 133, 134, 154, 186, 249, 254, and 256.
C.I. Direct Reds 37, 63, 75, 79, 80, 83, 99, 220, 224 and 227.
C.I. Acid Violets 11, 34 and 75.
C.I. Direct Violets 47, 48, 51, 90 and 94.
C.I. Reactive Reds 4, 23, 24, 31 and 56.
C.I. Acid Blues 9, 29, 62, 102, 104, 113, 117, 120, 175 and 183.
C.I. Direct Blues 1, 6, 8, 15, 25, 71, 76, 78, 80, 86, 90, 106, 108, 123, 163, 165, 199 and 226.
C.I. Reactive Blues 7 and 13.
C.I. Acid Yellows 3, 17, 19, 23, 25,, 29, 38, 49, 59, 61 and 72.
C.I. Direct Yellows 27, 28, 33, 39, 58, 86, 100 and 142.
C.I. Reactive Yellow 2.

AQUEOUS CARRIER MEDIUM

The aqueous carrier medium is water or a mixture of water and at least one water soluble organic solvent other than the heterocyclic diol compound.

Deionized water is commonly used. Selection of a suitable mixture of water and water soluble organic solvent, depends on requirements of the specific application, such as desired surface tension and viscosity, the selected pigment, drying time of the pigmented ink jet ink, and the type of paper onto which the ink will be printed.

Representative examples of water-soluble organic solvents that may be selected include (1) alcohols, such as methyl alcohol, ethyl alcohol, n-propyl alcohol, isopropyl alcohol, n-butyl alcohol, sec-butyl alcohol, t-butyl alcohol, iso-butyl alcohol, furfuryl alcohol, and tetrahydrofurfuryl alcohol; (2) ketones or ketoalcohols such as acetone, methyl ethyl ketone and diacetone alcohol; (3) ethers, such as tetrahydrofuran and dioxane; (4) esters, such as ethyl acetate, ethyl lactate, ethylene carbonate and propylene carbonate; (5) polyhydric alcohols, such as ethylene glycol, diethylene glycol, triethylene glycol, propylene glycol, tetraethylene glycol, polyethylene glycol, glycerol, 2-methyl-2,4-pentanediol, 1,2,6-hexanetriol and thiodiglycol; (6) lower alkyl mono- or di-ethers derived from alkylene glycols, such as ethylene glycol monomethyl (or -ethyl) ether, diethylene glycol mono-methyl (or -ethyl) ether, propylene glycol mono-methyl (or -ethyl) ether, triethylene glycol mono-methyl (or -ethyl) ether and diethylene glycol di-methyl (or -ethyl) ether; (7) nitrogen containing cyclic compounds, such as pyrrolidone, N-methyl-2-pyrrolidone, and 1,3-dimethyl-2-imidazolidinone; and (8) sulfur-containing compounds such as dimethyl sulfoxide and tetramethylene sulfone.

A mixture of a water soluble organic solvent having at least 2 hydroxyl groups such as, diethylene glycol and water is preferred as the aqueous carrier medium. In the case of a mixture of water, diethylene glycol and heterocyclic diol, the aqueous carrier medium plus nitrogen heterocyclic diol usually contains from about 30% water/70% solvent/nitrogen heterocyclic diol mixture to about 95% water/5% solvent/nitrogen heterocyclic diol mixture. The preferred ratios are approximately 60% water/40% solvent/nitrogen heterocyclic diol mixture to about 95% water/5% solvent/nitrogen heterocyclic diol mixture. The solvent/nitrogen heterocyclic diol mixture contains 15-95% nitrogen heterocyclic diol, preferably 25-75%.

Percentages are based on the total weight of the aqueous carrier medium plus nitrogen heterocyclic diol.

OTHER INGREDIENTS

The ink may contain other ingredients. For example, surfactants may be used to alter surface tension as well as promote penetration. However, they may also destabilize pigmented inks. Surfactants may be anionic, cationic, amphoteric or nonionic. Useful surfactants may be selected from McCutcheon's Emulsifiers and Detergents, published by Manufacturing Confectioners Publishing Company, Glen Rock, N.J. The choice of surfactant is highly dependent on the type of paper to be printed. It is expected that one skilled in the art can select the appropriate surfactant for the specific paper to be used in printing.

For example, the following surfactants were found to be useful in printing on Gilbert Bond paper (25% cotton) designated style 1057 manufactured by Mead Company, Dayton, Ohio.

| Supplier and Tradename | Description |
| --- | --- |
| Air Products | |
| Surfynol ® 465H | Ethoxylated Tetramethyl Decynediol |
| Surfynol ® CT-136 | Acetylenic Diol, Anionic Surfactant Blend |
| Surfynol ® GA | Acetylenic Diol Blend |
| Surfynol ® TG | Acetylenic Diol Blend in Ethylene Glycol |
| Cyanamid | |
| Aerosol ® OT | Dioctyl Ester of Sodium Sulfosuccinic Acid |
| Aerosol ® MA-80 | Dihexyl Ester of Sodium Sulfosuccinic Acid Mixture of Aerosol ® MA-80/ Aerosol OT 2/1 |
| Du Pont | |
| Duponol ® RA | Fortified Sodium Ether-Alcohol Sulfate |
| Merpol ® A | Ethylene Oxide, Ester Condensate |
| Merpol ® LF-H | Polyether |
| Merpol ® SE | Alcohol Ethoxylate |
| Merpol ® SH | Ethylene Oxide Condensate |
| Zelec ® NK | Alcohol Phosphate Composition |
| Fisher Scientific | |
| Polyethylene Glycol 3350 | |
| Polyethylene Glycol 400 | |
| Polyethylene Glycol 600 | |
| ICI | |
| Renex ® 30 | Polyoxyethylene (12) Tridecyl Ether |
| Synthrapol ® KB | Polyoxyethylene Alkyl Alcohol |
| Rohm & Haas | |
| Triton ® CF 10 | Alkylaryl Polyether |
| Triton ® CF 21 | Alkylaryl Polyether |
| Triton ® N 111 | Nonylphenoxy Polyethoxy Ethanol |
| Triton ® X 102 | Octylphenoxy Polyethoxy Ethanol |
| Triton ® X 114 | Octylphenoxy Polyethoxy Ethanol |
| Union Carbide | |
| Silwet ® L-7600 | Polyalkyleneoxide Modified Polydimethylsiloxane |
| Silwet ® L-7607 | Polyalkyleneoxide Modified Polydimethylsiloxane |
| Silwet ® L-77 | Polyalkyleneoxide Modified Polydimethylsiloxane |
| UCON ® ML1281 | Polyalkylene Glycol |
| W. R. Grace, Hampshire Div. | |
| Hamposyl ® Lida | Lauryoyl Iminodiacetic Acid. |

In aqueous inks, the surfactants may be present in the amount of 0.01-5% and preferably 0.2-2%.

Biocides may be present to inhibit growth of microorganisms. Dowicides ® (Dow Chemical, Midland, Mich. 48674), Omidines ® (Olin Corp., Chesire, Conn. 06410), Nopcocides ® (Henkel Corp., Ambler, Pa. 19002), Troysans ® (Troy Chemical Corp., Newark, N.J. 17105) and sodium benzoate may be used.

In addition, sequestering agents such as EDTA may also be included to eliminate deleterious effects of heavy metal impurities.

INK PREPARATION

The pigmented ink is prepared by premixing the selected pigment(s) and dispersant in water. In the case of dyes some of the same factors apply except that there is no dispersant present and no need for pigment deaggregation. The dye-based ink is prepared in a well agitated vessel rather than in dispersing equipment. Cosolvents and heterocyclic diol compounds may be present during the dispersion.

The dispersing step may be accomplished in a horizontal mini mill, a ball mill, an attritor, or by passing the mixture through a plurality of nozzles within a liquid jet interaction chamber at a liquid pressure of at least 1000 psi to produce a uniform dispersion of the pigment particles in the aqueous carrier medium.

It is generally desirable to make the pigmented ink jet ink in concentrated form. The concentrated pigmented ink jet ink, which is subsequently diluted to the appropriate concentration for use in the ink jet printing system. This technique permits preparation of a greater quantity of pigmented ink from the equipment. If the pigment dispersion is made in a solvent, it is diluted with water and optionally other solvents to obtain the appropriate concentration. If the pigment dispersion is made in water, it is diluted with either additional water or water soluble solvents to make a pigment dispersion of the desired concentration. By dilution, the ink is adjusted to the desired viscosity, color, hue, saturation density, and print area coverage for the particular application.

In the case of organic pigments, the ink may contain up to approximately 30% pigment by weight, but will generally be in the range of approximately 0.1 to 15%, preferably approximately 0.1 to 8%, by weight of the total ink composition for most thermal ink jet printing applications. If an inorganic pigment is selected, the ink will tend to contain higher weight percentages of pigment than with comparable inks employing organic pigment, and may be as high as approximately 75% in some cases, because inorganic pigments generally have higher specific gravities than organic pigments. The acrylic block polymer is present in the range of approximately 0.1 to 30% by weight of the total ink composition, preferably in the range of approximately 0.1% to 8%. If the amount of polymer becomes too high, the ink color density will be unacceptable and it will become difficult to maintain desired ink viscosity. Dispersion stability of the pigment particles is adversely affected if insufficient acrylic block copolymer is present. The amount of aqueous carrier medium plus nitro heterocyclic diol is in the range of approximately 70 to 99.8%, preferably approximately 94 to 99.8%, based on total weight of the ink when an organic pigment is selected, approximately 25 to 99.8%, preferably approximately 70 to 99.8% when an inorganic pigment is selected and 80 to 99.8% when a dye is selected.

Other additives, such as surfactants, biocides, humectants, chelating agents, and viscosity modifiers may be added to the ink. Optionally, other acrylic and non-acrylic polymers, may be added to improve properties such as water fastness and smear resistance.

Jet velocity, separation length of the droplets, drop size, and stream stability are greatly affected by the surface tension and the viscosity of the ink. The ink has physical properties compatible with a wide range of ejecting conditions, i.e., driving voltage and pulse width for thermal ink jet printing devices, driving frequency of the piezo element for either a drop-on-demand device or a continuous device, and the shape and size of the nozzle. They may be used with a variety of ink jet printers such as continuous, piezoelectric drop-on-demand and thermal or bubble jet drop-on-demand, and are particularly adapted for use in thermal ink jet printers. The inks have excellent storage stability for a long period and do not clog in an ink jet apparatus. Fixing the ink on the image recording material, such as, paper, fabric, film, etc., can be carried out rapidly and accurately.

The printed ink images have clear color tones, high density, excellent water resistance and lightfastness. Furthermore, the ink does not corrode parts of the ink jet printing device it comes in contact with, and it is essentially odorless.

EXAMPLES

The following examples are used to illustrate this invention without limitation.

Ink was prepared as follows: Dispersant Preparation:

A block copolymer of n-butyl methacrylate and methacrylic acid was prepared as follows:

3750 grams of tetrahydrofuran, 7.4 grams of p-xylene, were added to a 12-liter flask equipped with a mechanical stirrer, thermometer, nitrogen inlet, drying tube outlet, and addition funnels. The catalyst, tetrabutyl ammonium m-chlorobenzoate, and 3.0 ml of a 1.0M solution in acetonitrile, were then added to the flask. 291.1 grams (1.25M) of an initiator, 1,1-bis(trimethylsiloxy)-2-methyl propene, were injected. Feed I which consisted of tetrabutyl ammonium m-chlorobenzoate, and 3.0 ml of a 1.0M solution in acetonitrile, was started and added over 150 minutes. Feed II which consisted of 1976 gm (12.5M) trimethylsilyl methacrylate, was started at 0.0 minutes and added over 35 minutes. One hundred eighty minutes after Feed II was completed over 99% of the monomers had reacted. Feed III, which consisted of 1772 gm (12.5M) butyl methacrylate, was started and added over 30 minutes.

At 400 minutes, 780 grams of dry methanol were added to the above solution and distillation commenced. During the first stage of distillation, 1300.0 grams of material with a boiling point below 55° C. were removed from the flask. The theoretical amount of methoxytrimethylsilane, having a boiling point of 54° C., (BP=54° C.) to be removed was 1144.0 grams. Distillation continued during the second stage while the boiling point increased to 76° C. 5100 gms of isopropanol were added during the second stage of distillation. A total of 7427 grams of solvent were removed. The resultant resin solution was used directly in the next step. It contained 55.8% solids and had a neutralization equivalent of 4.65 milliequivalents of potassium hydroxide per gram of solids. Neutralization of Dispersant:

The following materials were added to a 1000 ml cylindrical polyethylene bottle:

200.0 grams dispersant solution
174.4 grams 15% potassium hydroxide
137.6 grams deionized water The mixture was tumbled on a roller mill for 3-4 hours and then magnetically stirred for 16-20 hours to give a slightly cloudy solution.

Preparation of Pigment Dispersion:

The following materials were added to a 1 liter beaker:

78.3 grams deionized water
66.7 grams neutralized dispersant solution
3.0 grams 15% potassium hydroxide The solution was mechanically stirred while 20.0 grams of carbon black pigment, FW 18 (Degussa Corp., Ridgefield Park, N.J. 07660) were added in portions. Stirring was continued for 30 minutes. The contents were then added to a Mini Motormill 100 (Eiger Machinery Inc., Bensenville, Ill. 60106) with another 32 grams of deionized water as a rinse. The contents were milled at 3500 rpm for one hour. The yield was 190.8 grams. The pH was 7.6. The particle size was 138 nm as determined by a Brookhaven BI-90 Particle analyzer (Brookhaven Instruments Corp., Holtsville, N.Y. 11742). Preparation of Inks:

The following ingredients were combined and added with magnetic stirring over 10-15 minutes to 22.5 grams of pigment dispersion:

2.6 grams diethylene glycol (Aldrich Chemical Co. Inc.) Milwaukee, WI 53233)
2.6 grams comparative cosolvent or heterocyclic diol
0.5 grams Silwet ® L-77 (Union Carbide Corp., Danbury, CT 06817)
37.2 grams deionized water

TABLE 1

Control Cosolvent And Heterocyclic Diol
Cosolvent Identification
The cosolvents are identified as follows:
Comparative Cosolvents

| | Control # |
|---|---|
| Dipropylene Glycol (Aldrich Chemical Co. Inc., Milwaukee, WI 53233) | 1 |
| Butyl Carbitol ® (Union Carbide Corp., Danbury, CT) | 2 |
| Dowanol ® TBH, (Dow Chemical, Midland, MI 48640) | 3 |
| | Example # |
| Dantocol ® DHE (Lonza, Inc., Fair Lawn, NJ 07410) | 1 |

TABLE 2

Decap Times
Decap times were obtained on a Hewlett Packard Deskjet printer that had been altered so that the ink cartridge would not be vacuum suctioned nor spit into a spittoon. The last time interval that the particular drop did not fail is recorded.

| | Drop | | |
|---|---|---|---|
| Sample | 1st seconds | 5th minutes | 32nd minutes |
| Control # 1 | 55 | 2.0 | 5.0 |
| 2 | 85 | 2.0 | 5.0 |
| 3 | 100 | 2.3 | 5.0 |
| Example 1 | 70 | 360+ | 360+ |

TABLE 3

Dispersion Stability
Dispersion stability was obtained by subjecting 15 grams of ink to four temperature cycles, each consisting of 4 hours at $-20°$ C. and 4 hours at $60°$ C. Particle sizes were measured on a Brookhaven BI-90 (Brookhaven Instruments Corp., Holtsville, NY 11742) before and after cycling.

| Sample | Change in Particle Size, delta nanometers |
|---|---|
| Control # 1 | 8 |
| 2 | 44 |
| 3 | 25 |
| Example # 1 | 4 |

What is claimed is:
1. An aqueous ink jet ink composition comprising:
   (a) an aqueous carrier medium,
   (b) a colorant selected from the group consisting of a pigment dispersion and a dye; and
   (c) a nitrogen heterocyclic diol having a solubility in water of at least 4.5 parts in 100 parts of water at 25° C., and which is the reaction product of a heterocyclic compound which is monocyclic and comprises either a 5- or 6- membered ring which comprises 2 trivalent nitrogen atoms with one carbon atom spaced between them, and said carbon atom is a part of one carbonyl group; and an alkylene oxide selected from the group consisting of ethylene oxide, propylene oxide, and mixtures thereof.

2. The aqueous ink jet ink composition of claim 1 wherein the nitrogen heterocyclic diol has the general formula:

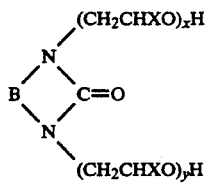

wherein $x+y=1-40$,
$X = -H$ or $-CH_3$, and
B is a divalent group completing a 5- or 6-membered ring and is selected from the group consisting of:

i.

wherein $R = -H, -CH_3, -C_2H_5,$ or $-C_3H_8$ ii.

wherein R and $R' = -H, -CH_3, -C_2H_5,$ or $-C_3H_8$ iii.

iv.

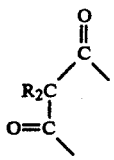

wherein $R = -H, -CH_3, -C_2H_5,$ or $-C_3H_8$ v.

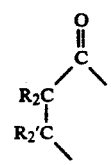

wherein R and $R' = -H, -CH_3, -C_2H_5,$ or $-C_3H_8$, and vi. 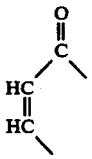

3. The ink composition of claim 1 wherein the pigment dispersion comprises a pigment and a dispersant.

4. The ink composition of claim 3 wherein the dispersant is a polymeric dispersant.

5. The ink composition of claim 2 or 4 wherein $x+y=1-10$.

6. The ink composition of claim 5 wherein $x+y=2-4$.

7. The ink composition of claim 1, 2, or 4 wherein the nitrogen heterocyclic diol is 1,3-bis[poly(2-oxyalkylene)]hydantoin having the general structure:

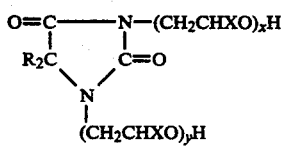

wherein R is —H, —CH$_3$, —C$_2$H$_5$, or —C$_3$H$_8$;
X is —H or —CH$_3$; and
$x+y=1-40$.

8. The ink composition of claim 7 in which X is —H, and $x+y=2$.

9. The ink composition of claim 8 wherein the nitrogen heterocyclic diol is bis-1,3-(2-hydroxyethyl)-5,5-dimethylhydantoin.

10. The ink composition of claim 1, 2, or 4 wherein the nitrogen heterocyclic diol is 1,3-bis[poly(2-oxyalkylene)]-2-imidazolidone.

11. The ink composition of claim 1, 2, or 4 wherein the nitrogen heterocyclic diol is 1,3-bis[poly(2-oxyalkylene)]-barbiturate.

12. The ink composition of claim 1, 2, or 4 wherein the nitrogen heterocyclic diol is 1,3-bis[poly(2-oxyalkylene)]-5,6-dihydro-uracil.

13. The ink composition of claim 1, 2, or 4 wherein the nitrogen heterocyclic diol is 1,3-bis[poly(2-oxyalkylene)]-uracil.

14. The ink composition of claim 1, 2, or 4 wherein the nitrogen heterocyclic diol is 1,3-bis[bis[poly(2-oxyalkylene)]-2,4,5-triketoimidazolidine.

15. The ink composition of claim 4 wherein the dispersant is an AB or BAB block copolymer wherein (a) the A segment is a hydrophobic homopolymer or copolymer of an acrylic monomer having the formula: CH$_2$=C(X) (Y) wherein X is H or CH$_3$; and Y is (O)OR$_1$, C(O)NR$_2$R$_3$, or CN, wherein R$_1$ is an alkyl, aryl, or alkylaryl group having 1 to 20 carbon atoms, and R$_2$ and R$_3$ are hydrogen or an alkyl, aryl, or alkylaryl group having 1 to 9 carbon atoms; said A segment having an average molecular weight of at least approximately 300 and being water insoluble; and (b) the B segment is a hydrophilic polymer, or salt thereof, of (1) an acrylic monomer having the formula:

CH$_2$=C(X) (Y$_1$)

wherein X is H or CH$_3$; and Y$_1$ is C(O)OH, C(O)NR$_2$R$_3$, C(O)OR$_4$NR$_2$R$_3$ or C(OR$_5$); wherein R$_2$ and R$_3$ are hydrogen or an alkyl, aryl, or alkylaryl group having 1 to 9 carbon atoms; R$_4$ is an alkyl diradical having 1 to 5 carbon atoms; and R$_5$ is an alkyl group having 1 to 20 carbon atoms and optionally containing one or more hydroxyl or ether groups; or (2) a copolymer of the acrylic monomer of (1) with an acrylic monomer having the formula:

CH$_2$=C(X) (Y)

where X and Y are the substituent group defined for the A segment; the B segment having an average molecular weight of at least approximately 300 and being water soluble.

16. The ink composition of claim 15 wherein the polymeric dispersant is an AB or BAB block copolymer wherein the A segment of said block copolymer is a homopolymer or copolymer prepared from at least one monomer selected from the group consisting of methyl methacrylate, ethyl methacrylate, propyl methacrylate, n-butyl methacrylate, hexyl methacrylate, 2-ethylhexyl methacrylate, octyl methacrylate, lauryl methacrylate, stearyl methacrylate, phenyl methacrylate, benzyl methacrylate, hydroxyethyl methacrylate, hydroxypropyl methacrylate, 2-ethoxyethyl methacrylate, methacrylonitrile, 2-trimethylsiloxyethyl methacrylate, glycidyl methacrylate, p-tolyl methacrylate, sorbyl methacrylate, methyl acrylate, ethyl acrylate, propyl acrylate, butyl acrylate, hexyl acrylate, 2-ethylhexyl acrylate, octyl acrylate, lauryl acrylate, stearyl acrylate, phenyl acrylate, benzyl acrylate, hydroxyethyl acrylate, hydroxypropyl acrylate, acrylonitrile, 2-trimethylsiloxyethyl acrylate, glycidyl acrylate, p-tolyl acrylate, and sorbyl acrylate.

17. The ink composition of claim 16 wherein the A segment of said block copolymer is a homopolymer or copolymer prepared from methyl methacrylate, n-butyl methacrylate, 2-ethylhexyl methacrylate or a copolymer of methyl methacrylate with butyl methacrylate.

18. The ink composition of claim 17 wherein the A segment is n-butyl methacrylate.

19. The ink composition of claim 15 wherein the B segment of said block copolymer is a homopolymer or copolymer prepared from at least one monomer selected from the group consisting of methacrylic acid, acrylic acid, dimethylaminoethyl methacrylate, diethylaminoethyl methacrylate, t-butylaminoethyl methacrylate, dimethylaminoethyl acrylate, diethylaminoethyl acrylate, dimethylaminopropyl methacrylamide, methacrylamide, acrylamide, and dimethylacrylamide.

20. The ink composition of claim 19 wherein the B segment of said block copolymer is a homopolymer of methacrylic acid or dimethylaminoethyl methacrylate.

21. The ink composition of claim 20 wherein the B segment of said block copolymer is a homopolymer of methacrylic acid.

22. The ink composition of claim 15 or 19 wherein the A segment of said block copolymer is a homopolymer of methyl methacrylate, n-butyl methacrylate, or 2-ethylhexyl methacrylate and the B segment is a homopolymer of methacrylic acid or dimethylaminoethyl methacrylate.

23. The ink composition of claim 15 or 19 wherein the B segment(s) constitute approximately 25 to 65%, by weight, of said block copolymer.

24. The ink composition of claim 4 wherein said ink contains approximately 0.1 to 15% by weight pigment, 0.1 to 30% by weight polymeric dispersant, and 70 to 99.8% by weight aqueous carrier medium plug nitrogen heterocyclic diol.

25. The ink composition of claim 24 wherein said ink contains approximately 0.1 to 8% by weight pigment, 0.1 to 8% by weight polymeric dispersant, and 94 to 99.8% by weight aqueous carrier medium plus nitrogen. heterocyclic diol.

26. The ink composition of claim 1 or 2 wherein the aqueous carrier medium comprises water and at least one water soluble organic solvent.

27. The ink composition of claim 26 wherein the aqueous carrier medium plug nitrogen heterocyclic diol contains from 30% by weight water/70% by weight solvent/nitrogen heterocyclic diol mixture to 95% by weight water/5% by weight solvent/nitrogen heterocyclic diol mixture.

28. The ink composition of claim 27 wherein the solvent/heterocyclic diol mixture contains 15-95% by weight nitrogen heterocyclic diol.

29. The ink composition of claim 28 wherein the solvent/nitrogen heterocyclic diol mixture contains 25-75% by weight nitrogen heterocyclic diol.

30. The ink composition of claim 1 or 2 wherein said ink contains up to approximately 20% by weight dye, and 80 to 99.8% by weight aqueous carrier medium plug nitrogen heterocyclic diol.

31. The ink composition of claim 26 wherein the aqueous carrier medium is a mixture of water and at least one water soluble organic solvent having at least 2 hydroxyl group.

32. The ink composition of claim 3 wherein the pigment comprises particles have a median particle size of approximately 0.005 to 1 micron.

33. The ink composition of claim 15 wherein the B segment is neutralized with a neutralizing agent selected from the group or organic bases, alkanolamines, alkali metal hydroxides, and mixtures thereof.

34. The ink composition of claim 1, 4 or 15 wherein a surfactant is present.

35. The ink composition of claim 34 wherein the surfactant is a polyalkyleneoxide modified polydimethylsiloxane.

* * * * *